3,137,742
METHOD OF PRODUCING CERAMIC FUELS FOR NUCLEAR REACTORS

Ronald George Sowden, Wallingford, England, assignor to United Kingdom Atomic Energy Authority, London, England
No Drawing. Filed Aug. 22, 1961, Ser. No. 133,053
Claims priority, application Great Britain Sept. 5, 1960
8 Claims. (Cl. 264—21)

The present invention relates to a ceramic fuel for nuclear reactors.

It is considered that for certain classes of reactor it would be advantageous to provide a ceramic fuel material containing a proportion of plutonium as an enrichment, the fuel material being primarily uranium dioxide. Although the content of plutonium is small in thermal reactor fuel materials, for example less than 1%, it must be uniformly distributed and this introduces difficulties if the fuel is required in pellet form and the degree of enrichment must not vary considerably between pellets. For these reasons it is considered that it may be impracticable to form pellets from a physical mixture of uranium and plutonium dioxides prepared by simple blending on a large scale.

A method which has been proposed for preparing enriched fuel material of the type in question is to prepare solutions of plutonium and uranium compounds, mix these solutions in the necessary proportions, co-precipitate plutonium and uranium compounds from the mixed solutions, and calcine the precipitate to prepare the corresponding oxides. Whilst this procedure is excellent in theory, it suffers from a practical disadvantage. Thus it will be known that, in addition to being an alpha-emitter, plutonium and its compounds are intensely toxic so that very special handling techniques are necessary. If this procedure is adopted, the minor addition to plutonium at an early stage means that all subsequent stages of processing must be carried out with the special techniques, thus complicating the plant to an excessive degree.

It is obviously therefore an advantage to introduce the plutonium at as late a stage as possible and it is an object of the present invention to provide such an advantageous process.

According to the present invention, there is provided a process for the production of ceramic fuel material for nuclear reactors which comprises dissolving a plutonium compound in an organic solvent, mixing such solution with an organic binding agent, adding such mixture to powdered uranium dioxide, compacting and sintering.

Thus it will be seen that, instead of adding the plutonium at an early stage in the process, it is only added to the uranium at the last practicable moment.

The preferred plutonium compound is plutonyl dinitrate which is soluble in many polar organic solvents, the preferred such solvent being methyl isobutyl ketone (hexone).

One suitable organic binding agent is polybutyl methacrylate but other polymers soluble in organic solvents may be used, for example polyvinyl esters and other polymethacrylate esters. The binding agent may be plasticised with a suitable agent, for example glycerol or dibutylphthalate. The solvent for the binding agent is preferably hexone but alternatively it may be toluene, acetone, methyl ethyl ketone, trichloroethylene, carbon tetrachloride or any suitable mixture thereof.

After mixing the plutonium solution with the binding agent and plasticiser, this mixture is added to powdered uranium dioxide to granulate the same and heating is then effected to dry the powder by evaporating the organic solvent. This dry granular material may then be cold-compacted at a pressure sufficient to form a uniform coherent body, the pressure for example being 20 to 30 tons per sq. inch (3140–4710 kg./cm.$^2$).

In order to obtin satisfactory granulation, the organic binding agent should be used in proportions between 1% and 6% by weight of the uranium dioxide and the plasticiser may be present in proportions of approximately 10% by weight of the binding agent. It is satisfactory to make up a solution of 30% acetone or toluene, 64% polybutyl methacrylate and 6% dibutyl phthalate (parts by weight), and to add up to 300 parts by weight of hexone in which the plutonium compound has been dissolved.

In order to prepare the solution of plutonium in hexone, it is convenient to take an aqueous solution of plutonyl dinitrate in nitric acid, add aluminium nitrate to act as a salting out agent and then add ammonia to reduce the acidity of the solution to about pH 2. Successive contacting of the aqueous solution with separate batches of hexone can provide a hexone solution containing in excess of 0.1 molar plutonium.

On heating, the hexone, acetone or toluene is driven off and, on further heating, the plutonium compound is converted to the dioxide.

The uranium dioxide may be stoichiometric or non-stoichiometric but it is preferred to use an oxide wherein the ratio of oxygen atoms to uranium atoms is less than 2.3 and it is convenient to proceed in accordance with our co-pending U.S. appln. Serial No. 36,467 filed June 16, 1960.

Thus the compacted green body is preferably heated for a period of time in an oxidising atmosphere in order to remove the organic binder and increase the oxygen to uranium ratio to at least 2.3. Thereafter the body may be sintered to provide a dense compact. If the sintering is effected in an inert atmosphere, a non-stoichiometric compact will result. However, if the sintering is effected in hydrogen or if the sintering in an inert atmosphere is followed by heating in hydrogen, a stoichiometric compact will result. The initial heating may be at a temperature in the range 200° C. to 250° C. for a period of about 14 to 16 hours and the green compact should be heated slowly to this temperature, for example at a rate not exceeding 35° C. per hour and preferably slower. The sintering may be effected at 1300° C. to 1500° C. in an inert atmosphere or 1500° C. to 1700° C. in hydrogen but if an already sintered body is to be heated in hydrogen the temperature need only be in excess of 1000° C.

However, as an alternative to carrying out the initial heating of the green compact in oxygen, it is possible to adopt the procedure of our co-pending U.S. appln. Serial No. 106,185 filed April 28, 1961.

Thus as an alternative to sintering as above described, the green compact may be sintered in an atmosphere of carbon dioxide or a mixture of carbon monoxide and carbon dioxide. The time and temperature necessary to obtain maximum density depend on the proportion of plutonium and the proportion, if any, of carbon monoxide, but the temperature will normally be in the range of 1400° C. to 1600° C. One advantage of this method is the slightly lower final temperature necessary, and by choosing a suitable proportion of carbon monoxide in the range 1:10 to 100:1 a stoichiometric compact can be obtained without the risk of reducing the plutonium to the trivalent state which may occur on heating in hydrogen to 1700° C. A further advantage is that slow heating during the removal of the binding agent is not necessary.

As a still further alternative the green compact may be sintered directly in an inert or reducing atmosphere, e.g. argon or hydrogen, but as explained an argon atmosphere gives no control of the oxygen ratio whilst a hydrogen atmosphere may be too strongly reducing.

An example of the method of carrying the invention into effect is as follows:

Example

To 60 ml. of an aqueous solution of plutonyl dinitrate in nitric acid, containing 5 g. plutonium, was added sufficient aluminium nitrate to give a 2-molar solution thereof, and sufficient ammonia to increase the pH of the solution to 2. The resulting solution was then contacted successively with 4 separate batches of 30 ml. of hexone. Each batch of hexone, containing extracted plutonium, was separated and all 4 batches combined to give 120 ml. of an 0.1-molar solution of plutonyl di-nitrate in hexone. The hexone solution was then mixed with 40 ml. of a binder composition consisting of a 60% solution of plasticised polybutyl methacrylate in toluene, and this mixture was intimately mixed with 800 g. uranium dioxide of formula $UO_{2.10}$ and having a surface area of 4.6 sq. m./g. The hexone was removed by drying at 100° C., which produced a free-flowing powder. This powder was compacted at 30 tons/sq. in. and sintered at 1500° C. for 3 hours in an atmosphere of argon. The sintered product consisted of an intimate mixture of plutonium and uranium oxides containing approximately 0.7% by weight of plutonium oxide, and haivng a density of 10.2 g./cc.

I claim:

1. The method of producing a uranium dioxide-plutonium dioxide ceramic fuel material for nuclear reactors which comprises dissolving a plutonium salt in an organic solvent for such plutonium salt, adding an organic binding agent for uranium dioxide to said solution, combining the solution containing the binding agent with powdered uranium dioxide, drying the resulting mixture to remove the solvent and produce a free flowing powder, compacting the powder, and heating the compacted powder at an elevated temperature and for a period of time sufficient to effect a sintering thereof and produce an intimate mixture of uranium dioxide and plutonium dioxide.

2. The process of claim 1, wherein the organic binding agent is polybutyl methacrylate.

3. The process of claim 2, wherein dibutyl phthalate is added to plasticise the polybutyl methacrylate.

4. The process of claim 1, wherein the sintering is effected at 1500° C. to 1700° C. in an atmosphere selected from the group consisting of argon and hydrogen.

5. The process of claim 1, wherein the sintering is effected at 1400° C. to 1600° C. in an atmosphere selected from the group consisting of carbon dioxide and a mixture of carbon dioxide with carbon monoxide.

6. The process of claim 1, wherein prior to sintering, the compacted powder is heated to between 200° C. and 250° C. in oxygen.

7. The method of producing a uranium dioxide-plutonium dioxide ceramic fuel material for nuclear reactors which comprises dissolving plutonyl dinitrate in hexone, adding an organic binding agent for uranium dioxide to said solution, combining the solution containing the binding agent with powdered uranium dioxide, drying the resulting mixture to remove the solvent and produce a free flowing powder, compacting the powder, and heating the compacted powder at an elevated temperature and for a period of time sufficient to effect a sintering thereof and produce an intimate mixture of uranium dioxide and plutonium dioxide.

8. The process of claim 7, wherein the solution of plutonium in hexone is prepared by successively contacting at pH 2 an aqueous solution of plutonyl dinitrate containing aluminium nitrate with portions of hexone.

References Cited in the file of this patent

UNITED STATES PATENTS 2,868,707     Alter et al.              Jan. 13, 1959

OTHER REFERENCES

AEC Document BMI-1009, June 1955, pages 24 and 25.

AEC Document, TID 7546, Book, 2 November 1957, pages 531–535, page 533 relied upon.

Reactor Handbook 2nd Edition, vol. I, June 1960, published by Interscience Publishers Inc., N.Y., page 69 relied upon.

Martin et al.: $UO_2$ Fabrication, Chemical and Process Engineering, July 1960, pages 291–303, pages 293–294 relied upon.